United States Patent [19]

Anglade et al.

[11] Patent Number: 5,454,624
[45] Date of Patent: Oct. 3, 1995

[54] MULTI-POSITION SEAT AND ITS APPLICATION ESPECIALLY TO MOTOR VEHICLES

[75] Inventors: Gerard Anglade, Pannes; David Amorim, Amilly; Bruno Derias, Montargis, all of France

[73] Assignee: Cesa -Compagnie Europeenne de Sieges pour Automobiles, Perret Cedex, France

[21] Appl. No.: 245,499

[22] Filed: May 18, 1994

[30] Foreign Application Priority Data

May 19, 1993 [FR] France .................................. 93 06061
Apr. 6, 1994 [FR] France .................................. 94 04042

[51] Int. Cl.⁶ .............................. B60N 2/02; B60N 2/24
[52] U.S. Cl. .............. 297/354.13; 297/320; 297/378.12; 297/342
[58] Field of Search ................................... 297/319, 316, 297/321, 320, 322, 354.13, 378.12, 378.14, 342

[56] References Cited

U.S. PATENT DOCUMENTS

| | | | |
|---|---|---|---|
| 2,612,211 | 9/1952 | Gielow et al. | 297/321 |
| 3,311,405 | 3/1967 | Brennan . | |
| 3,328,077 | 6/1967 | Krasinski | 297/378.14 |
| 3,727,976 | 4/1973 | Lystad . | |
| 3,973,799 | 8/1976 | Berg . | |
| 4,268,086 | 5/1981 | Okuyama | 297/321 |
| 4,344,649 | 8/1982 | Fleischer | 297/354.13 |
| 4,444,431 | 4/1984 | Suzuki | 297/321 |
| 4,518,201 | 5/1985 | Wahlmann et al. | 297/316 |
| 4,874,205 | 10/1989 | Arefinejad | 297/378.12 |
| 5,038,437 | 8/1991 | Russell et al. | 297/378.12 |

FOREIGN PATENT DOCUMENTS

| | | |
|---|---|---|
| 228923 | 7/1987 | European Pat. Off. . |
| 239502 | 9/1987 | European Pat. Off. . |
| 2217921 | 9/1974 | France . |
| 2318759 | 2/1977 | France . |
| 1455468 | 4/1969 | Germany . |
| 2099691 | 12/1982 | United Kingdom . |

*Primary Examiner*—Peter R. Brown
*Assistant Examiner*—Anthony Barfield
*Attorney, Agent, or Firm*—Sughrue, Mion, Zinn, Macpeak & Seas

[57] ABSTRACT

The seat made up of a seat (10) with a moving framework (11) for a cushion (12), of a backrest (20) with a moving framework (21) for a cushion (22), of an underframe (30) intended to make the seat rest on a floor, of an articulation (40), as well as of linkage rods (50) for automatically controlling the relative displacements of these cushions (12, 22) is noteworthy in that these linkage rods (50) comprise, on the one hand, a connecting rod (51) connecting, in articulated manner, one of the extremities of the framework (11) to the underframe (30) and, on the other hand, a connecting rod assembly (52) connecting, in articulated manner, the other of the extremities of the framework (11) to the framework (21) so that, in a first mode, when the backrest (20) passes from its normal position to one of its extreme positions, the seat part (10) retains, at least locally, a practically stationary position so that its cushion (21) faces the cushion (22) and that, in a second mode, when the backrest (20) passes from its normal position to the other of its extreme positions the seat part (10) changes position so that its cushion (11) comes practically into alignment with the cushion (21), and vice versa.

22 Claims, 6 Drawing Sheets

MULTI-POSITION SEAT AND ITS APPLICATION ESPECIALLY TO MOTOR VEHICLES

The present invention relates to seats, and particularly, to the seats of land-based motor vehicles capable of occupying several, preferably predetermined, adjustment positions.

The contemporary tendency of motor car manufacturers is to design so-called "single-volume people carrier" vehicles which derive both from the internal compartment called an "estate" and from the utility vehicle called a small van. Given the universal nature of use envisaged for these vehicles, it is necessary to equip them with seats which are capable of assuming multiple and varied, preferably predetermined, positions, that is to say capable of assuming a number of discrete positions, each position being well-defined. Seats of this type must, for example, be capable of opening out completely into a bunk if needs be, into a relaxation chair or lounger, into a normal so-called driving or travelling seat, and must also be able to be retracted so as to fold out partially into a panel or fold up totally in a compact and relatively unbulky manner for the purpose of withdrawing them into the vehicle in order to release space therein, or remove them from the latter.

Such seats must also satisfy safety standards decreed by professional organizations or the Authorities, so that the occupant of a seat is effectively held in the latter by the seat belt in the event of violent impacts, particularly with a high longitudinal component, referenced with respect to the vehicle.

The latter constraint becomes particularly difficult to satisfy when, as becomes more and more common, such a seat belt is no longer directly anchored at two or three points to the structure or shell of the vehicle, the seat belt being somewhat independent of the seat, but in contrast this seat belt forms part of the seat and is somewhat "on board" the latter, the various points of anchorage of the seat belt being established and anchored directly on the seat itself. In such a situation of an on-board seat belt, in the event of violent impacts, the forces to be absorbed and/or transmitted are therefore essentially localized in the zone of the axis of relative inclination of the backrest and of the seat part of the seat, on the one hand, and in the zone of the underframe habitually connecting the seat to the ground or floor of the vehicle, on the other hand.

It is understood that there is every possible difficulty in satisfying all of these requirements, which are often contradictory, in particular when it is remembered that such a seat must be mass-produced and at minimum cost.

Seats of this type have already been proposed. Solutions are set forth, for example, especially in the documents FR 92-02 172, 92 04 448, 92 06 997 and 92 15 857 filed by the Applicant Company to which reference may easily be made. Although these solutions give satisfaction, they are not suitable for all cases.

The object of the invention is to construct a multi-function seat for general use which can be used in particular on board land-based motor vehicles of the "people carrier" type and which are comfortable and which also satisfy the safety standards.

The invention relates to a seat with an inclinable backrest, the displacements of which entrain the concomitant displacements of the seat part according to two different operating modes, a first mode according to which when the backrest is displaced in one direction, from its so-called normal position, it causes the rear part of the fixed seat part to recoil very slightly whilst causing its front part to lower so as to retract it and leave it in this position which can be qualified as stationary and a second mode according to which when the backrest is displaced in the opposite direction, from this normal position, it entrains the seat part in a concomitant manner, moving it forward and raising it.

The subject of the invention is a multi-position seat with at least one normal position and, if needs be, one neighbouring relaxation position which separate two extreme positions, particularly for a vehicle, made up, inter alia, of a seat part with a moving framework for a cushion, of a backrest with a moving framework for a cushion, of an underframe intended to rest the seat on the ground or floor, of an articulation making it possible to change the relative positions of these seat part and backrest cushions, as well as of linkage rods for automatically controlling the relative displacements of these seat part and backrest cushions during change in their relative positions. This seat is noteworthy in that these linkage rods comprise, on the one hand, a connecting rod connecting, in articulated manner, one of the extremities of the seat part framework to the underframe and, on the other hand, a connecting rod assembly connecting, in articulated manner, the other of the extremities of the seat part framework to the backrest framework so that, in a first operating mode, when the backrest passes from its normal position to one of its extreme positions, the seat part retains, at least locally, a practically stationary position so that its cushion faces the backrest cushion and that, in a second operating mode, when the backrest passes from its normal position to the other of its extreme positions, the seat part changes position so that its cushion comes practically into alignment with the backrest cushion.

This seat is noteworthy in that the connecting rod assembly comprises a cam and a cam follower which are, in the case of one of them, associated with the underframe and, in the case of the other, with the backrest, a control arm which is mounted so that it tilts on a pin and which is articulated to this other of the extremities of the seat part framework and in that the underframe comprises at least one front leg and a connecting rod which connects the seat part framework to the underframe and which is articulated, on the one hand, in proximity to the front end of the framework and, on the other hand, in proximity to the front leg.

This seat is noteworthy in that the connecting rod assembly comprises a cam and a cam follower which are, in the case of one of them, associated with the underframe and, in the case of the other, capable of being entrained by the backrest, a control arm which is mounted so that it can tilt on a pin and which is articulated to this other of the extremities of the seat part framework as well as a lock made of a keeper which is associated with the backrest framework and of a lock bolt which is mounted so that it can pivot on the control arm and which carries the cam follower.

The subject of the invention is also an application of a seat of the aforementioned type to a land-based motor vehicle, particularly a motor vehicle of the "people carrier" sort for example.

Other characteristics of the invention will emerge upon reading the following description and claims as well as from examining the appended drawing, given solely by way of example in which:

Since articulated or multi-position seats and most specially those among them intended for vehicles, for example land-based motor vehicles, are well-known in the art, the following description will describe only that which directly or indirectly relates to the invention. For the rest, the person skilled in the art in the technical sector in question will delve into the common conventional solutions at its disposal so as to face up to the specific problems with which he is confronted.

In that which follows, one same reference numeral is always used to denote a homologous element, regardless of the embodiment or its variant.

For the convenience of the explanation, each of the constituent parts of an improved seat according to the invention will be described in turn before describing, if necessary, the manufacture and assembly thereof, and its operation.

In that which follows, a seat according to the invention is described with specific application to a land-based motor vehicle, but it is obvious that the applications of such a seat are not limited to this.

In that which follows, all the indications relating to the orientation of the seat such as front, rear, top, bottom, right, left, lateral are made with respect to the conventional axes of orientation of a vehicle, and are identified with respect to the position in which a seat according to the invention occupies its so-called normal position such that when it is occupied the person sitting in it is pointing along the axis of the road facing the windscreen of the vehicle.

Since such a seat is most often symmetrical with respect to a median plane parallel to a plane passing through the longitudinal axis of the vehicle, it will be sufficient to describe and/or illustrate one of the sides thereof, namely the right-hand side or the left-hand side. It is, however, obvious that this symmetry is not absolutely necessary and that some of the constituent parts of the seat according to the invention may be located only on one side.

As is seen, in a conventional manner, a seat according to the invention is intended to rest on a ground or floor P preferably of a land-based motor vehicle.

Such a seat essentially comprises a seat part 10, a backrest 20, an underframe 30, an articulation 40, and linkage rods 50.

The seat part 10 comprises a moving framework 11 with one front extremity 111 and one rear extremity 112. This framework, of any appropriate conventional type, made, for example, of tubes and corner pieces which are shaped and mechanically joined, is intended to carry a cushion 12 of any appropriate conventional type. This cushion is represented symbolically by its outline on a vertical median plane.

The backrest 20 comprises a movable framework 21 intended to receive a cushion 22. That which was mentioned earlier with regard to the framework and the cushion of the seat part is valid here with regard to the framework and the cushion of the backrest.

The underframe 30, intended to rest the seat on the ground or floor P, comprises, for example, a front leg 31 and a rear leg 32. If needs be, these legs are articulated as illustrated, and are provided with appropriate anchoring devices which allow the seat to be anchored to the floor in a removable manner as is known. If needs be, the front legs in particular are equipped with hinge pins or hinges or the like so as to be able to tip the whole seat, particularly forwards, relative to the floor. This is conventional and will not be expanded upon further.

The articulation 40 defines an axis 400 which makes it possible to change the orientation of the cushion of the backrest relative to the cushion of the seat part. This articulation of any conventional appropriate type is formed integrally with the seat part and backrest frameworks or else comprise flanges which are fixed to these frameworks. Such an articulation makes it possible to define various discrete clearly defined positions and, if needs be, to lock the seat in each of these positions. If needs be, for at least some of these positions such as the normal or road-going position or else to the relaxation or lounging position, the articulation also allows a change in orientation with respect to at least one of these nominal positions, in a continuous or discontinuous manner. All this is conventional, particularly in the motor industry, which is why it will not be expanded upon further. Reference could, for example, usefully be made to document FR 92 02 172.

The linkage rods 50 essentially comprise, on the one hand, a connecting rod 51 connecting, in an articulated manner, one, 111, of the extremities of the seat part framework 11 to the underframe 30 and, on the other hand, a connecting rod assembly 52 connecting, in articulated manner, the other, 112, of the extremities of the seat part framework 11 to the backrest framework 21. These linkage rods are such that in a first operating mode, when the backrest 20 passes, in tipping, in one direction from its normal position (FIG. 2 or 6B) to one of its extreme positions, for example its folded-up position (FIG. 4 or 6C), the seat part 10 retains a practically fixed position defined previously so that its cushion 12 faces the backrest cushion 21 and that, in a second operating mode, when the backrest 20 passes, in tipping, in the opposite direction, from its normal position (FIG. 2 or 6B) to the other of its extreme positions, for example its bunk position (FIG. 3 or 6A), the seat part 10 changes position so that its cushion 11 comes practically into alignment with the backrest cushion 21, and vice versa.

The connecting rod assembly 52 comprises a cam 521 interacting with a cam follower 522 and a control arm 523. If needs be, the connecting rod assembly 52 comprises a small connecting rod 524 or a lock 525 and a limit stop 526.

One of these which are the cam and the cam follower, is associated with the underframe or backrest, and the other of these is associated with the backrest or underframe. In the embodiment illustrated, the cam 521 is associated directly or indirectly with the underframe 30 and the cam follower 522 is associated directly or indirectly with the backrest 20. The inverse solution may be adopted.

The cam 521 is, for example, like a ramp, for example with a slit or slot which exhibits two separate sections 5211 and 5212 in succession, between which sections if needs be, there is a transition zone 5213. One of these sections gives the first operating mode and the other of these gives the second operating mode.

One of these sections, in this case the section 5211, is, for example, rectilinear, while the other of these sections, in this case the section 5212, is curved, for example. The transition zone 5213 facilitates passage from one of these sections to the other, and therefore passage from one of the two operating modes to the other.

The cam 521 is cut directly into the underframe, as illustrated, or else into a plate or the like attached onto and fixed to the underframe in any appropriate manner, for example welding, riveting, screwing on etc.

The cam follower 522 is, for example, like a peg, rod, pin or the like which will be returned to in more detail later, and is intended in particular to interact with the cam 521.

Figure 5:
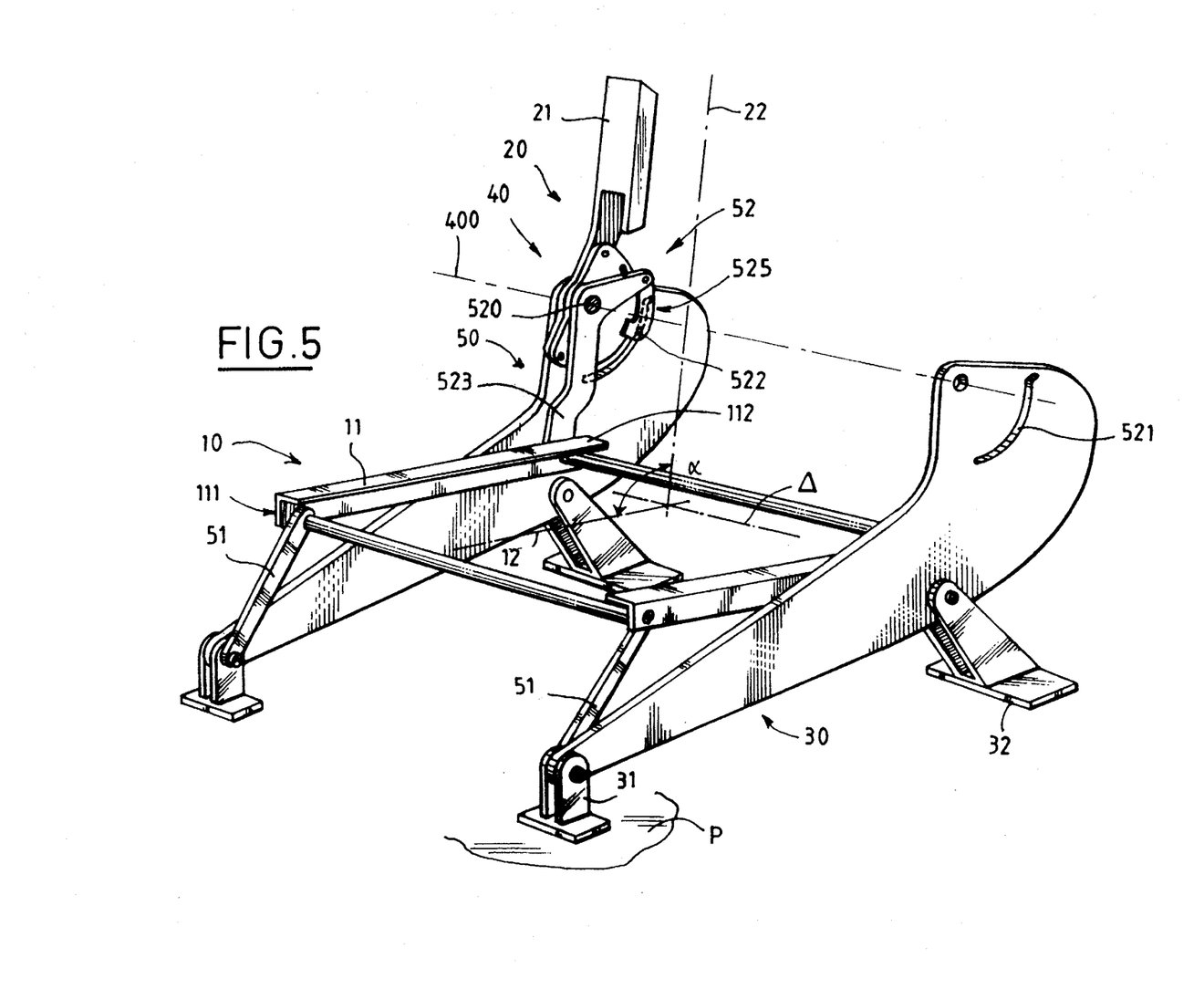
FIG. 5 is a diagrammatic partial perspective view of another embodiment of a seat according to the invention.
Figures 6A, 6B:
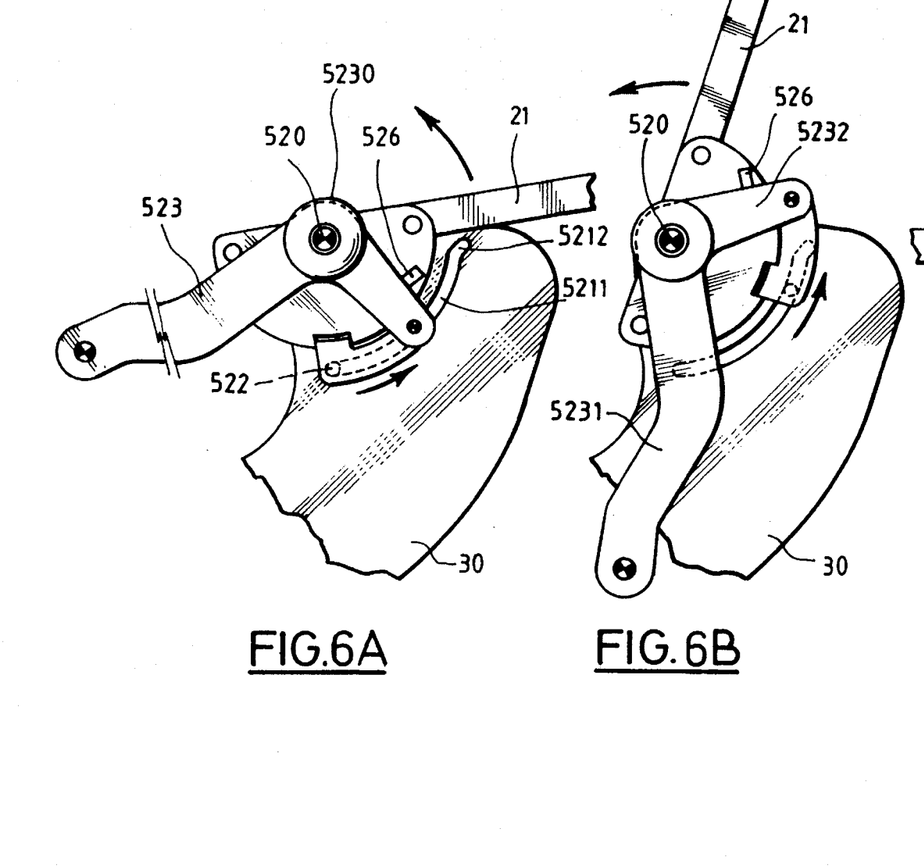
FIGS. 6A, 6B and 6C are diagrammatic partial side views of the embodiment of FIG. 5, illustrating the latter in various positions which it assumes during its operation, the view 6A corresponding to the second operating mode when the seat passes to its extreme so-called "bunk" position to its normal position, the view 6B corresponding to the first operating mode when the seat passes from its normal position to its other extreme so-called "shelf" or "compact" or "folded-up" position, and the view 6C corresponding to this "shelf" or "compact" or "folded-up" position.
Figure 6C:
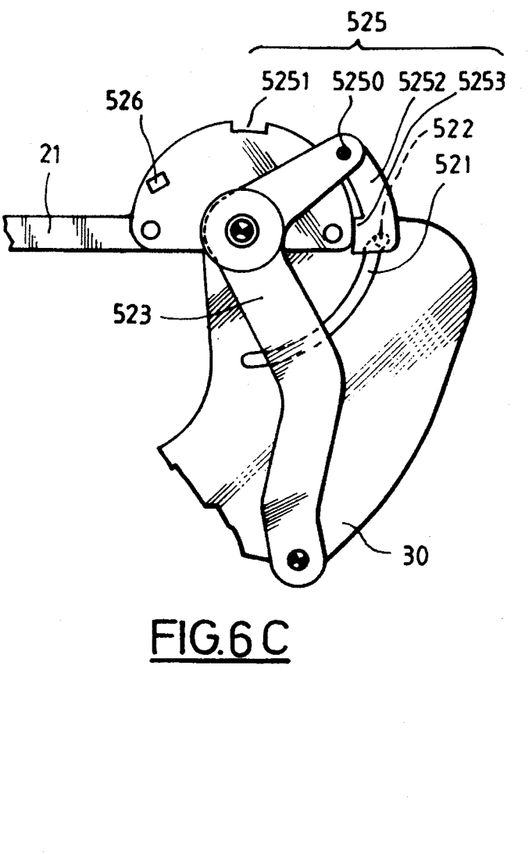

As can be observed for the embodiment of FIGS. 5 and 6, the cam follower 522 which is like a peg or the like, is crimped onto the lock bolt, preferably in the vicinity of the tooth, as illustrated.

As can be observed for one of the embodiments, the cam follower 522 is simultaneously in engagement with the cam 521 and with the profile 5233. The cam follower 522 is like a peg or the like, for example crimped onto the small connecting rod 524 with, for example, one part equipped with a bush with square outer cross-section engaged in the slot 5233 of the control arm 523 and with, for example, one part equipped with a bush with circular outer cross-section engaged in the ramp-shaped slit in the cam 521 in order to decrease friction.

The control arm 523 is mounted so that it can tilt on a pin 520 and is mounted articulated on the seat part framework 11. The control arm 523 is, for example, in the general form of an angle bracket with a vertex 5230 which is articulated to the pin 520 and with a branch 5231 which is articulated, in proximity to the rear extremity 112 of the seat part framework, and with a branch 5232. This control arm for the embodiment of FIGS. 1 to 4 carries a profile 5233 which can be superimposed, at least in part, on the cam, which is, for example, in the form of a linear slot and which is situated on the branch 5232.

It will be observed that for the two embodiments illustrated, the pin 400 about which the backrest pivots is practically coincident with the pin 520 about which the control arm tilts. However, it will be noted that this coincidence of these two pins is optional.

It will be observed that for the embodiment of FIGS. 1 to 4, the straight section 5211 of the cam 521 and likewise the linear profile 5233 of the control arm 523 are radial and pass, for example, through the pin 520, while the curved section 5212 of the cam 521 is a circular arc centred on the pin 520.

It will be observed that for the embodiment of FIGS. 5 and 6, the first section 5211 is a circular arc centred on the pin 520 about which the control arm 523 tilts, for reasons which will be understood later.

The small connecting rod 524 includes an end 5240 which is articulated to an extension 211 of the framework 21 of the backrest, and an end 5241 which carries the cam follower 522. The lock 525 is made of a keeper 5251 and of a lock bolt 5252. In this embodiment, the keeper 5251 is associated with the backrest framework 21 and the lock bolt 5252 is mounted so that it pivots on the branch 5232 of the control arm and carries the cam follower 522. The keeper 5251 is in the form of a notch or nick or the like and the lock bolt is like a catch, one end of which bears a pivot 5250 of any appropriate type fixed to the branch 5232 of the control arm 523. The other end of the catch carries a tooth 5253 or similar intended to interact with the nick or notch in the keeper.

As is seen, the keeper of the lock 525 is formed in a plate or the like in the shape of a circular sector which forms part of or which is fixed to the framework 21 of the backrest 20 by any appropriate manner, for example welding, riveting, screwing, etc. This circular sector is centred on the pin 520 and its periphery carries the notch or nick of the keeper.

The limit stop 526 is located in the path of the control arm 523, and in particular that of its branch 5232 so as to act on it when the backrest is tipped from one of its extreme positions to the other as will be understood later. This limit stop of any appropriate type is, for example, carried by the circular sector-shaped plate.

All the components of a seat according to the invention are manufactured from metal or synthetic materials, shaped by appropriate conventional techniques. All these constituents are joined together, assembled and mounted as will emerge clearly from the figures of the drawing.

It will be observed that the articulations necessary for the operation of a seat according to the invention are illustrated in the figures of the drawing in the form of a circular chequered pattern for convenience of illustration. These articulations are made in any appropriate manner, for example with the aid of ball-bearings or plain bearings made of bearing surfaces and of pins, bolts, rivets, etc, as is conventional.

The operation of the first embodiment illustrated in FIGS. 1 to 4 of a seat according to the invention will now be explained.

In the embodiments illustrated it will be observed that the seat part cushion 12 and the backrest cushion 22, represented diagrammatically by their outlines, intersect, at least virtually, along the vertex edge $\Delta$ of a dihedron of angle $\alpha$. This angle $\alpha$ varies by the order of 20° when the seat according to the invention passes from its normal position to its relaxed position, and vice versa.

The variation in the angle $\alpha$ is obtained, for example, with the aid of a hydraulic thrust cylinder for immoblization of any conventional appropriate type, not illustrated, which is interposed, for example, between the rear of the front leg and the top of the backrest. This thrust cylinder, which is preferably a single one and situated on one of the sides of the seat, allows the inclination of the backrest to be varied and also the backrest to be immobilized in the chosen position whilst resisting, as required, the loadings due to the presence of the upper, shoulder-level, anchoring point of a seat belt of the so-called on-board type. It will be noted that this resistance to exceptional loadings or stresses is necessary, above all, for the normal and relaxed positions.

Figure 1:
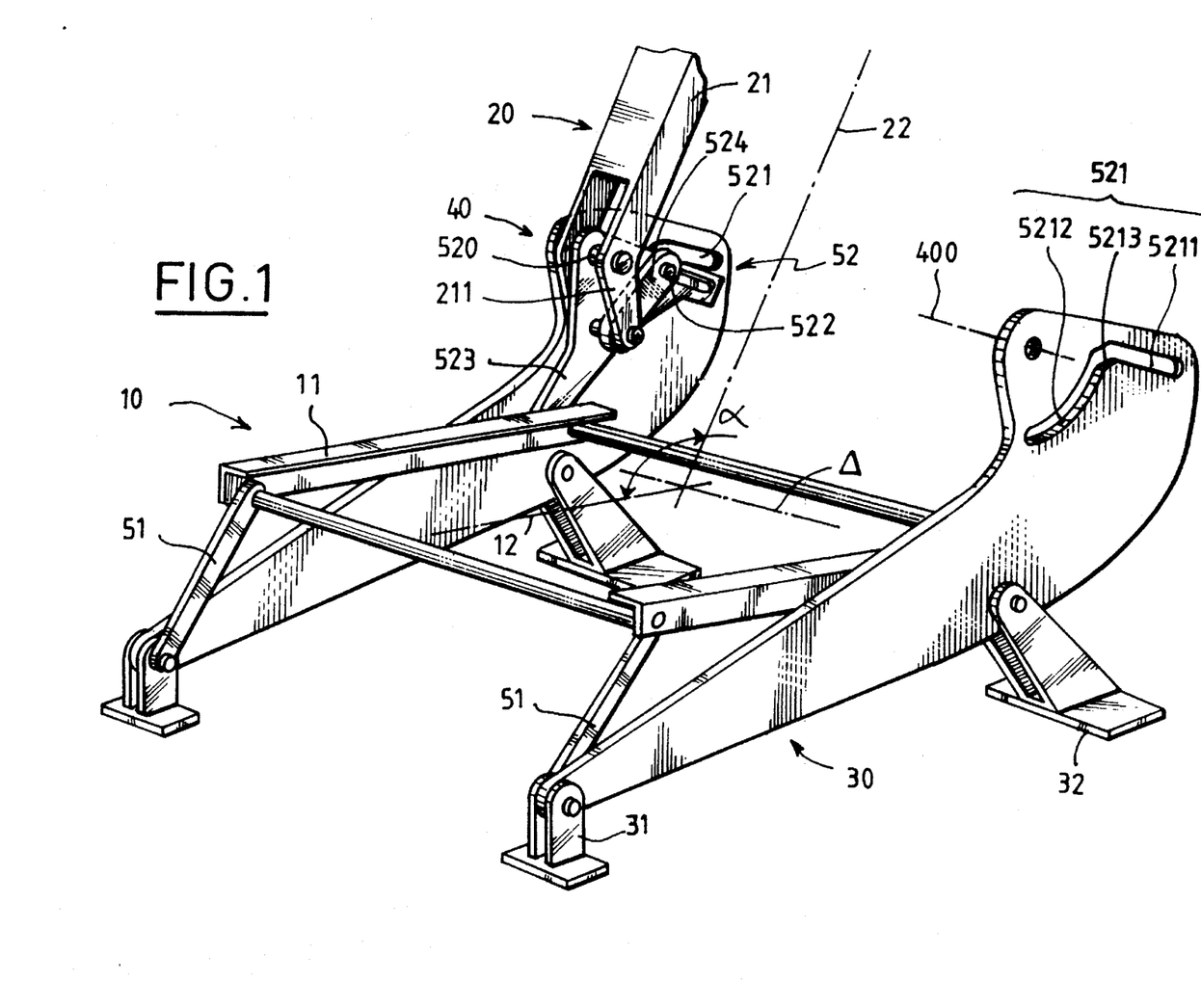
FIG. 1 is a diagrammatic partial perspective view of one embodiment of a seat according to the invention.
Figure 2:
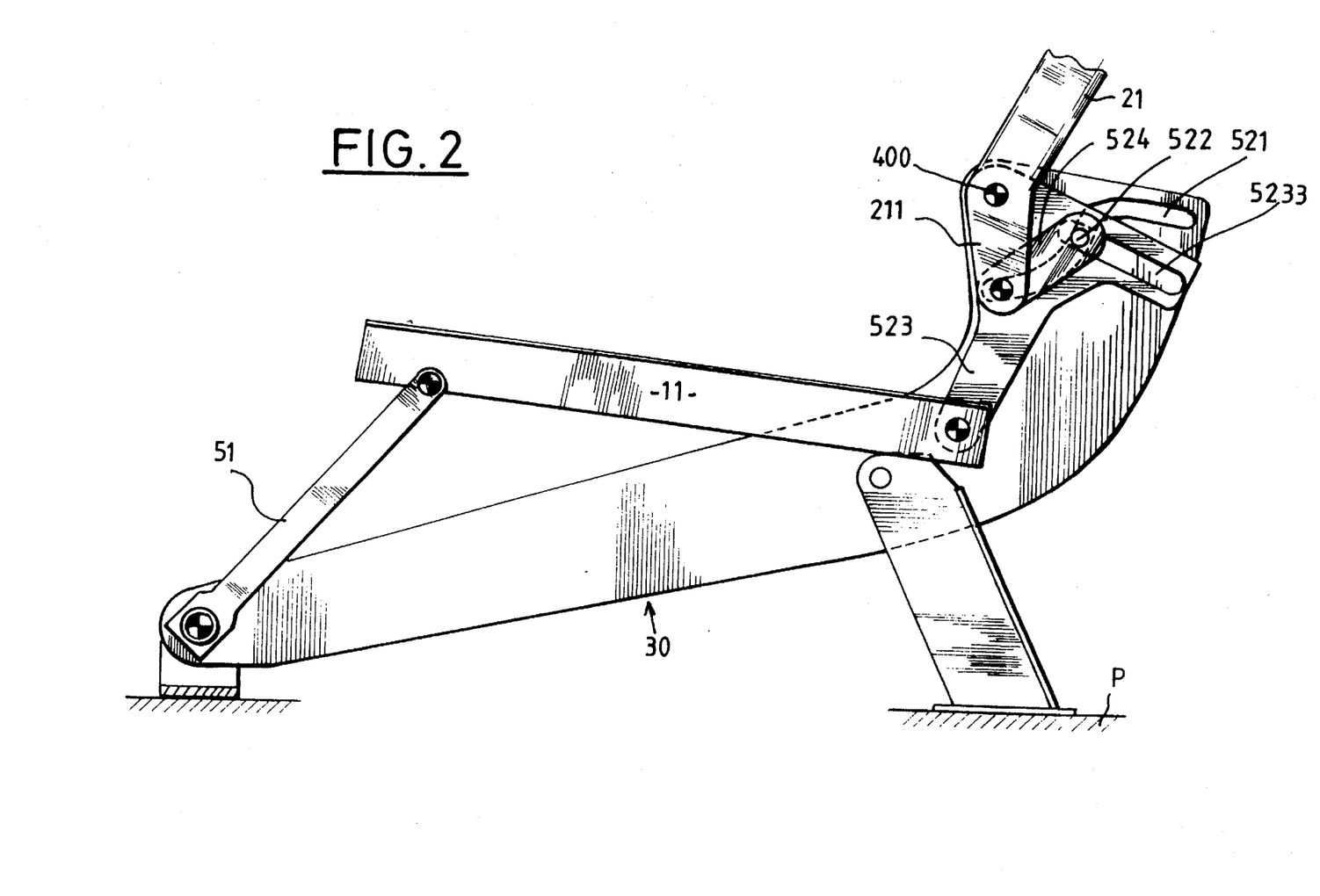
FIG. 2 is a partial view in side elevation of the embodiment of the seat of FIG. 1 represented in the so-called normal position.

It will be assumed that initially the seat occupies its normal or road-going position, as illustrated in FIGS. 1 and 2.

Figure 3:
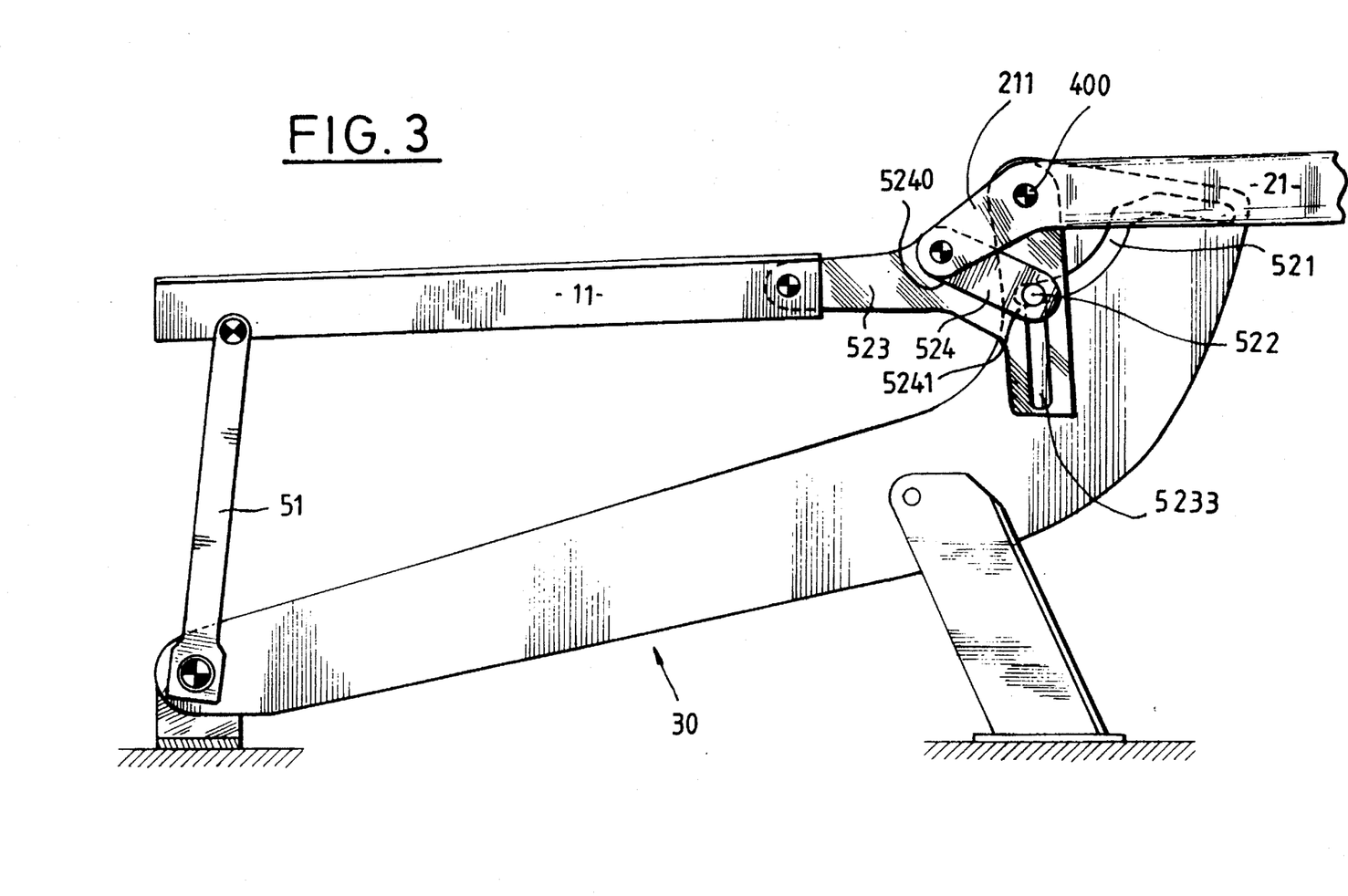
FIG. 3 is a view similar to that of FIG. 2 in the extreme so-called bunk position.

The articulation or the immobilization thrust cylinder is unlocked with the aid of its control, as is conventional, then the backrest is inclined backwards, causing it to rotate in the clockwise direction when looking at the figures of the drawing, into the bunk position illustrated in FIG. 3. In tipping, the backrest entrains the small connecting rod which, itself, entrains the cam follower and makes it travel towards the left along that curved part of the ramp of the cam which is in the shape of a circular arc. It will be observed that during this displacement, the relative position of the pins 400–520, and of the articulation joining the extension of the backrest to the small connecting rod, as well as of the cam follower 522, does not change. Everything therefore takes place as if the cam follower formed an integral part of the extension of the backrest. The cam follower 522 entrains, in its displacement, the control arm 523 bearing on one of the flanks of the slot 5233. It will be observed that everything takes place as if the control arm formed part of the extension of the backrest. The control arm therefore tips through an angle identical to that through which the backrest tips, and gives rise to a concomitant displacement of the seat part. The seat part rises, inclining a bit towards the rear, passing from the normal road-going position to the relaxation or lounger position. This slight inclination is due to the action of the connecting rod.

It will be observed that when the seat according to the invention occupies its relaxation position, the configuration which it assumes is conducive to comfort and safety. Indeed, this shape "extends" the seat part surface area offered when the backrest is further inclined than when it is in its normal position and thus gives better support to the sides. The front part of the seat part rises up a little, which improves the postural comfort and also safety whilst avoiding any risk of the occupant sliding between the seat belt and the seat by a so-called "submarining" effect.

It will be observed that when the backrest is passed from the relaxation position to the bunk position, the seat part cushion is totally moved forwards and raised so that it comes practically in alignment, almost horizontally, with the cushion of the backrest, which improves comfort by almost totally eliminating any step between the cushions.

Figure 4:
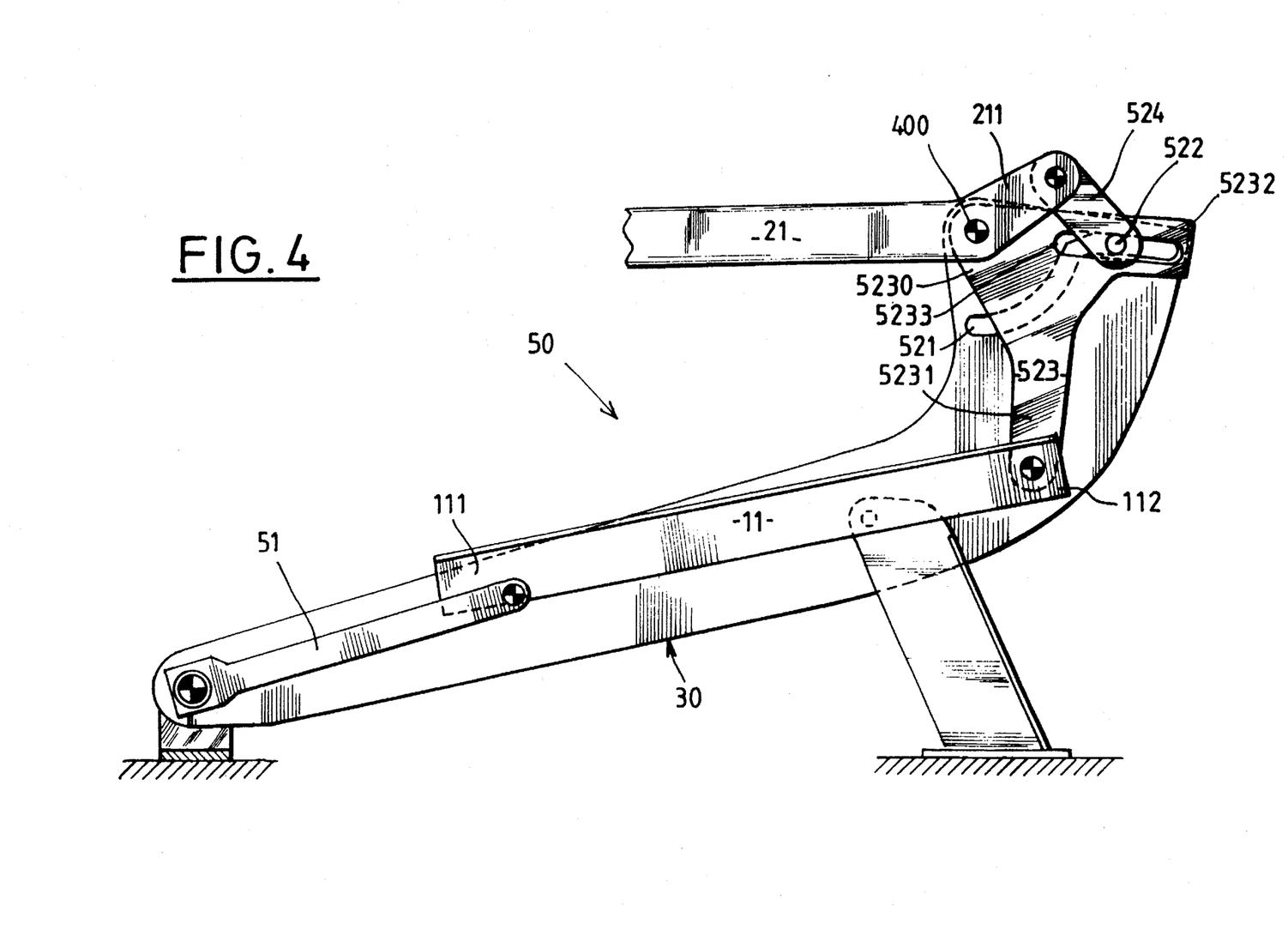
FIG. 4 is a view similar to that of FIG. 2 in which the seat is illustrated in the extreme so-called folded-down position.

There will now be explained the operation when the backrest is inclined in the opposite direction, the anticlockwise direction, in order to pass it from its normal position to its folded-forward position, for example in the form of a shelf. For a small part of its travel the cam follower, as illustrated in FIG. 4, still remains in the curved section of the cam and still stays trapped by the profile of the slot. The control arm therefore turns through a few degrees and causes the seat part to recoil a very small amount, the height of the rear part of which said part practically does not vary. By continuing its travel, the backrest makes the small connecting rod push the cam follower into the transition zone then into the radial section of the ramp. The cam follower then entrains, in its travel, the slot-shaped profile so that the radial part of the section of the cam and the profile of the slot are superimposed at least partially. Continuing to tip the backrest pushes the cam follower into these superimposed parts. The angle formed by the small connecting rod and the extension of the backrest varies.

It will be observed that the cam follower gives interlocking of the control arm and of the underframe regardless of its position in the radial parts of the cam and of the profile. Everything takes place as if the control arm were then stationary and rendered integral with the underframe. The backrest can freely continue its folding forward, the small connecting rod follows it.

It will be observed that the seat part retains a position which is, at least locally, practically stationary. In this case, the rear end is displaced very little and retains a practically constant distance above the floor, whereas its front extremity "dips down" a little, moving closer to the floor. The size of such a "dip" is a function of the dimensions of the connecting rod and of the location of its articulations and may be reduced to a practically zero value by a judicious choice of the appropriate parameters.

It will be observed that when the backrest is thus folded down forwards, the seat part occupies its most retracted position which gives the seat a great compactness without there being any notable interference between the padding of the seat part and backrest cushions. It is then possible to use the rear surface of the backrest, for example, as a shelf or the like or to close the seat up still further before folding it up "like a wallet" and/or to tip it forwards in order to take it out of the vehicle if needs be.

It is therefore understood that by virtue of the seat according to the invention a continuous displacement of the backrest, and components which are always in engagement are obtained, which features make sure either that the control arm is secured to the backrest (inclination of the backrest backwards) or that the control arm is secured to the underframe (folding the backrest forwards). With a seat according to the invention, it is observed that the control arm can either move with the backrest, or is fixed with respect to the underframe. It will also be noted that the displacements of the seat part are directed by the control arm and that these displacements are kinematically linked to those of the backrest, or that the seat part remains immobile.

It will be observed that in its first operating mode, when the seat passes from its normal position to its folded-down position, the control arm and the backrest are free whereas the control arm and the underframe are locked to one another, whereas in its second operating mode, when the seat passes from its normal position to its bunk position, the control arm and the backrest are locked to one another whereas the control arm and the underframe are free.

For the convenience of the explanation and the simplification of production, it has been contrived for the articulation pin 400 and the pin 520 about which the control arm tilts to be geometrically coincident, or practically such. It is obvious that they may be separate and not coincident.

The same goes for the articulation of the connecting rod to the underframe which may be not coincident with the articulation of the front leg.

The curved section of the cam may be not centred on the pin by which the backrest is articulated to the underframe. In such a case there is a slight displacement of the control arm with respect to the backrest during the inclination of the latter backwards. Such a result is not necessarily detrimental, and may even be sought.

As emerges from the foregoing, the cam and the profile can be superimposed at least in part. If that is not the case, there is a slight displacement of the seat part during the folding-down of the backrest forwards. This is not necessarily detrimental and may even be sought. Likewise, the relative position and the shape of the cam and of the profile may be other than those described. This, in particular, is the case of the rectilinear section and of the linear profile which are described as radial; the essential feature is that they can be superimposed, at least locally, so that the cam follower interlocks them regardless of the position relative to these cams and profiles in their superimposable parts, particularly those which are not straight and not radial. It is, however, important for their orientations to be correct so that the cam follower carries out this interlocking and also the entrainment of the control arm when it leaves the superimposable parts.

The operation of the second embodiment illustrated in FIGS. 5 and 6 of a seat according to the invention will now be explained.

It is assumed that initially the seat occupies the extreme position in which it is illustrated in FIG. 6A which is that in which the seat is in the so-called bunk position. It will be observed that the framework of the backrest is in an approximately horizontal position and that the rear extremity of the seat part framework which is articulated to the branch of the control arm is raised. It will also be observed that the lock bolt is engaged in the keeper of the lock and that the cam follower is at the extremity of the circular arc-shaped section of the cam in which it is engaged.

If, starting from this position, the backrest is raised, it is seen that the control arm tilts with it turning in the anticlockwise direction. The control arm entrains the rear opposite end of the seat part downwards whilst making it recoil. This simultaneous rotation takes place until the cam follower arrives at the opposite end of the circular arc-shaped section of the cam. When the cam follower engages in the other section of the cam, the lock bolt becomes disengaged from the keeper and remains disengaged until it becomes immobilized, whilst being released when the cam follower arrives at the other extremity of the section of the cam and stops there. As the lock bolt is articulated to the branch of the control arm, the latter is immobilized in the position in which it is illustrated in FIG. 6C whereas the backrest, for its part, is now detached from the control arm and therefore from the seat part. The backrest can hence continue its rotation in the anticlockwise direction in order to reach a position in which its cushion faces that of the cushion of the seat part, in the folded-down, compact, or shelf position.

In order to open out the seat, it is sufficient to make the backrest tip in the clockwise direction from the situation illustrated in FIG. 6C. When the limit stop encounters the branch of the control arm on which the lock bolt is articulated, the backrest entrains with it the control arm and the lock bolt is simultaneously automatically reengaged when the keeper is again situated vertically in line with the lock bolt which engages therein, entrained by the action of the cam follower which follows the cam.

It will be observed that the seat part retains a position which is, at least locally, practically stationary, in this case the rear extremity is displaced very little (FIGS. 6B and 6C) and keeps a practically constant distance above the floor whereas its front extremity "dips" a little, moving closer to the floor. The extent of such a "dip" is a function of the dimensions of the connecting rod and of the location of its articulations, and may be reduced to a practically zero value by a judicious choice of the appropriate parameters.

It will be observed that when the backrest is thus folded down forwards (FIG. 6C) the seat part occupies its most retracted position which gives the seat great compactness without there being any noticeable interference between the padding of the seat part and backrest cushions. It is then possible to use the rear surface of the backrest for example as a shelf or the like, or to close the seat up still further before folding it up like a "wallet" and/or tipping it forwards in order to extract it from the vehicle if needs be.

In the foregoing it was assumed that the components of a seat according to the invention were situated at least on that side of the seat which carries the anchoring point for an on-board seat belt. It is obvious that a symmetrical mounting located on the other side may be used. It will be observed however, that the kinematics according to the invention are indispensable solely on one side provided that the seat part is held well and describes a correct trajectory. In order to achieve this, a connecting rod is used which fulfils the role of a double balance arm or the like which transmits the displacement of a front lateral part of the seat part to the opposite part situated on the other side. In that way, the seat part is kept rigid at three points and it is sufficient to connect, in articulated manner, a fourth point of the latter, in this case the lateral rear part of the seat part opposite the one articulated to the control arm, to a support bar or the like which is articulated to the underframe, for example on the pin 400 or in proximity to the latter so as to be somewhat "suspended". There is no risk of the seat part thus held at four points deforming or buckling under the weight of its occupant.

It will also be observed that an improved seat according to the invention operates without elastic means for returning the backrest to the normal or road-going position. Indeed, the weight of the occupant alone, when the occupant is resting on the seat part, is sufficient to exert a force on the control arm, which raises the backrest.

It will be observed that the invention, owing to the small number of components which it implements, is relatively simple to manufacture with "tight" tolerances which reduce the play and therefore the operating noise. Likewise, the invention contributes to improving the mechanical strength and therefore safety because the forces are transmitted via the lock practically without making use of cam and cam follower, in the event of a frontal impact which would, in particular, cause the occupant of the seat to "submarine". This mechanical strength may be increased even more by giving the keeper and the lock bolt of the lock "engaging" shapes which promote an interlocking which increases with the forces brought into play, practically without making use of cam and cam follower which would only intervene as a last resort if keeper and lock bolt were to become detached from each other.

The foregoing clearly illustrates the distinctive features of the invention, demonstrates the advantages which it affords and makes it possible to perceive the whole benefit which it offers.

We claim:

1. A multi-position seat with a seat part (10) and a backrest (20), whereby the seat is movable between two extreme positions where said backrest (20) is substantially horizontal, a first extreme position in which said backrest is folded over said seat part, and a second extreme position in which the backrest is rearwardly reclined relative to said seat part, there being between said extreme positions a normal position, where said backrest (20) is substantially vertical, and a relaxation position where said backrest (20) is inclined relative to the vertical, wherein:

said seat part (10) has a first moving framework (11) for a seat part cushion (12); and said backrest (20) has a second moving framework (21) for a backrest cushion (22);

said multi-position seat comprising:

an underframe (30) adapted to rest the seat on a floor;

an articulation (40), connecting said underframe to said first and second frameworks (11, 21) and defining an axis (400), and making it possible to change the relative positions of said seat part cushion and said backrest cushion (12, 22); and a plurality of linkage rods (50) for automatically controlling the relative displacements of said seat part cushion and said backrest cushion (12, 22) during a change in their relative positions;

wherein said linkage rods (50) comprise: a connecting rod (51) connecting, in an articulated manner, one (111) of two extremities (111, 112) of said seat part framework (11) to said underframe (30); and a connecting rod assembly (52) connecting, in an articulated manner, another (112) of said extremities (111, 112) of the seat part framework (11) to said backrest framework (21), and wherein said underframe (30) comprises at least one front leg (31), and wherein said connecting rod (51) connecting said seat part framework (11) to said underframe (30) is pivotally connected, at one end, in proximity to said one extremity (111) of the framework (11), and also, at another end, in proximity to said from leg (31);

so that, in a first operating mode, when said backrest (20) passes from its normal position to its first extreme position, said seat part (10) has at least a part which remains in a substantially unchanged position so that said seat part cushion (12) faces said backrest cushion (22), and so that, in a second operating mode, when said backrest (20) passes from its normal position to its second extreme position, said articulation causes said said seat part (10) to change position so that the seat part cushion (12) comes practically into an about horizontal alignment with said backrest cushion (22), and vice versa.

2. The seat according to claim 1, characterized in that the connecting rod assembly (52) comprises a cam (521) and a cam follower (522), one of which is operatively connected with the underframe (30), and the other of which is operatively connected with the backrest (20), a control arm (523) which is mounted so that it can tilt on a pin (520) and which is articulated to the other (112) of the extremities (111, 112) of the seat part framework (11) and which carries a slot (5233) which can be superimposed, at least in part, with the cam (521), as well as a small connecting rod (524) having two ends, one (5240) of the ends (5240, 5241) of which is articulated to the framework (21) of the backrest, and the other (5241) of the ends (5240, 5241) of which carries the cam follower (522) so that the latter simultaneously interacts with the cam (521) and the slot (5223).

3. Seat according to claim 2 characterized in that the cam (521) comprises a ramp with two distinct successive sections (5211, 5212) between which is located a transition zone (5213), one (5211) of these sections (5211, 5212) giving the first operating mode and the other (5212) of these sections (5211, 5212) giving the second operating mode.

4. Seat according to claim 3, characterized in that, in the first operating mode, the control arm (523) is kept immobilized relative to the underframe (30) by the cam follower (522), whereas the backrest framework (21) can be displaced relative to the control arm (523), and in the second operating mode, the control arm (523) can be displaced relative to the underframe (30) under the action of the cam follower (522) whereas the backrest framework (21) is held immobilized relative to the control arm (523) by the cam follower (522).

5. Seat according to claim 4, characterized in that one (5211) of the sections (5211, 5212) of the cam (521) is rectilinear and the other (5212) of these sections (5211, 5212) is curved, and in that the profile (5233) of the control arm (523) is linear.

6. Seat according to claim 5, characterized in that the curved section (5212) of the cam (521) is centred on the pin (520) about which the control arm (523) tilts.

7. Seat according to claim 6, characterized in that the pin (520) about which the control arm (523) tilts is coincident with the axis (400) of the articulation (40).

8. Seat according to claim 7, characterized in that the control arm (523) is in the overall shape of an angle bracket with a vertex (5230) which is articulated to the pin (520), with one branch (5231) which is articulated in proximity to the front extremity (111) of the seat part framework (11) and with one branch (5231) which is equipped with the slot (5233).

9. The seat according to claim 8, characterized in that the cam (521) is operatively connected with the underframe (30) and is in the form of a curved slot in said underframe.

10. Seat according to claim 9, characterized in that the backrest framework (21) is equipped with a downward extension (211) and in that this extension (211) is connected to the connecting rod assembly (52).

11. Seat according to claim 10, characterized in that the downward extension (211) is articulated to said other end (5240) of the small connecting rod (524).

12. Seat according to claim 11, characterized in that the cam follower (522) is peg-shaped with one part equipped with a bush of square outer cross-section engaged in the slot (5233) in the control arm and with a part equipped with a bush with circular outer cross-section engaged in the curved slot of the cam (521).

13. The seat according to claim 1, characterized in that the connecting rod assembly (52) comprises a cam (521) and a cam follower (522), one of which is operatively connected with the underframe (30) and the other of which is capable of being entrained by the backrest (20), a control arm (523) which is mounted so that it can tilt on a pin (520) and which is articulated to the other (112) of the extremities (111, 112) of the seat part (10) framework (11), and a lock (525) made of a keeper (5251) which is operatively connected with the backrest (20) framework (21) and of a lock bolt (5252) which is mounted so that it can pivot on the control arm (523) and which carries the cam follower (522).

14. Seat according to claim 13, characterized in that the cam (521) comprises a curved slot with two successive separate sections (5211, 5212), one (5211) of which defines the first operating mode, and the other (5212) of which defines the second operating mode.

15. Seat according to claim 14, characterized in that, in the first operating mode, the control arm (523) is held immobilized relative to the underframe (30) by the interposition of the cam (521) and of the cam follower (522), whereas the backrest framework (21) can be displaced relative to the control arm (523) and in that, in the second operating mode, the control arm (523) can be displaced relative to the underframe (30) while the backrest framework (21) is held immobilized relative to the control arm (523) by the lock (525).

16. Seat according to claim 13, characterized in that the first section (5211) of said curved slot is in the shape of a circular arc centred on the pin (520) about which the control arm (523) tilts.

17. Seat according to claim 16, characterized in that the keeper (5251) is a notch and in that the lock bolt (5252) is a catch, one end of which carries a pivot (5250) operatively connected with the control arm (523), and another end of which is equipped with a tooth (5253) intended to interact with the notch.

18. Seat according to claim 17, characterized in that the control arm (523) is in the overall shape of an angle bracket with a vertex (5230) which is articulated to the pin (520) with one branch (5231) which is articulated in proximity to the front extremity (111) of the seat part (10) framework (11), and with one branch (5231) which is equipped with the lock bolt (5252).

19. The seat according to claim 18, wherein said keeper (5251) is formed in a plate in the shape of a circular sector, which plate is operatively connected with said framework (21) of the backrest (20) which is centered on said pin (520), and the periphery of which carries said notch of the keeper (5251).

20. The seat according to claim 19, wherein said plate is in the shape of a circular sector and is integral with, or fixed to, said framework (21) of the backrest (20).

21. The seat according to claim 20, comprising a limit stop (526) carried by the keeper (5251) and adapted to interact with the control arm (523).

22. The seat according to claim 21, wherein said follower (522) is peg-shaped, and one part of which is provided with a bush engaged with said cam (521).

* * * * *